(12) United States Patent
Glancey (10) Patent No.: US 12,539,357 B2
(45) Date of Patent: Feb. 3, 2026

(54) DIALYSIS APPARATUS WHICH ULTRA-FILTERS BLOOD AND A RELATED METHOD

(71) Applicant: IPSWICH MEDICAL RESEARCH LIMITED, Essex (GB)

(72) Inventor: Gerald Robert Glancey, Essex (GB)

( * ) Notice: Subject to any disclaimer, the term of this patent is extended or adjusted under 35 U.S.C. 154(b) by 0 days.

(21) Appl. No.: 19/110,792

(22) PCT Filed: Nov. 16, 2023

(86) PCT No.: PCT/IB2023/061603
§ 371 (c)(1),
(2) Date: Mar. 11, 2025

(87) PCT Pub. No.: WO2024/105616
PCT Pub. Date: May 23, 2024

(65) Prior Publication Data
US 2025/0269101 A1    Aug. 28, 2025

(30) Foreign Application Priority Data
Nov. 18, 2022 (GB) ...................... 2217306

(51) Int. Cl.
*A61M 60/37* (2021.01)
*A61M 1/16* (2006.01)
(Continued)

(52) U.S. Cl.
CPC ............ *A61M 1/3413* (2013.01); *A61M 1/16* (2013.01); *A61M 1/1601* (2014.02);
(Continued)

(58) Field of Classification Search
CPC .... A61M 1/16; A61M 1/1601; A61M 1/1615; A61M 1/1633; A61M 1/1645;
(Continued)

(56) References Cited

U.S. PATENT DOCUMENTS

| 4,702,829 A | 10/1987 | Polaschegg et al. |
| 2004/0084372 A1* | 5/2004 | Connell ................ G06F 3/0482 210/745 |

(Continued)

FOREIGN PATENT DOCUMENTS

| CA | 2518969 C | 5/2011 |
| EP | 0904789 A2 | 3/1999 |

(Continued)

OTHER PUBLICATIONS

"International Search Report" in PCT/IB2023/061603, dated Feb. 21, 2024.
(Continued)

*Primary Examiner* — John Kim
(74) *Attorney, Agent, or Firm* — William H Bollman (57) ABSTRACT

This invention relates to a dialysis apparatus which ultra-filters blood and to a related method of ultra-filtering blood ex-vivo.
More preferably the invention relates to haemodiafiltration using protein-losing membranes and a secondary ultrafiltration and partial re-infusion of haemodiafiltrate for increasing extraction of middle molecules and protein bound uraemic toxins and reducing albumin loss.

21 Claims, 4 Drawing Sheets

(51) Int. Cl.
  *A61M 1/34* (2006.01)
  *A61M 60/113* (2021.01)
(52) U.S. Cl.
  CPC ........ *A61M 1/1615* (2014.02); *A61M 1/1633* (2014.02); *A61M 1/1645* (2014.02); *A61M 1/1647* (2014.02); *A61M 1/1649* (2014.02); *A61M 1/3403* (2014.02); *A61M 1/3437* (2014.02); *A61M 1/3448* (2014.02); *A61M 1/3468* (2014.02); *A61M 1/3482* (2014.02); *A61M 60/113* (2021.01); *A61M 60/37* (2021.01); *A61M 2202/0498* (2013.01); *A61M 2205/15* (2013.01); *A61M 2205/18* (2013.01); *A61M 2205/33* (2013.01); *A61M 2205/3331* (2013.01); *A61M 2205/3337* (2013.01); *A61M 2205/3365* (2013.01)
(58) Field of Classification Search
  CPC .............. A61M 1/1647; A61M 1/1649; A61M 1/3403; A61M 1/3413; A61M 1/3437; A61M 1/3448; A61M 1/3468; A61M 1/3482; A61M 60/37; A61M 60/113; A61M 2202/0498; A61M 2205/15; A61M 2205/18; A61M 2205/33; A61M 2205/3331; A61M 2205/3337; A61M 2205/3365
  See application file for complete search history.

(56) References Cited

U.S. PATENT DOCUMENTS

2004/0182787 A1* 9/2004 Chevallet ............ A61M 1/3451
  210/85
2005/0131332 A1* 6/2005 Kelly .............. A61M 1/362265
  604/4.01

FOREIGN PATENT DOCUMENTS

| EP | 2324870 A1 | 5/2011 |
| EP | 2380610 A1 | 10/2011 |
| FR | 2530146 A1 | 7/1982 |
| WO | 84/00112 A1 | 1/1984 |
| WO | 2015/011290 A1 | 1/2015 |

OTHER PUBLICATIONS

"Written Opinion of the International Searching Authority" in PCT/IB2023/061603, dated Feb. 21, 2024.
"Combined Search and Examination Report under Sections 17 & 18(3)" in GB2217306.6, dated Jan. 30, 2023.

* cited by examiner

DIALYSIS APPARATUS WHICH ULTRA-FILTERS BLOOD AND A RELATED METHOD

FIELD

This invention rates to a dialysis apparatus which ultra-filters blood and to a related method of ultra-filtering blood ex-vivo.

More preferably the invention relates to hemodiafiltration (HDF) using protein-losing membranes and a secondary ultrafiltration and partial re-infusion of hemodiafiltrate for increasing extraction of middle molecules and protein bound uremic toxins whilst reducing albumin loss.

BACKGROUND

When carrying out extracorporeal dialysis, an increase in intradialytic extraction of low molecular weight proteins (LMWP), is thought to have a beneficial effect. For the purpose of the present application low molecular weight proteins are within the range of 10 kDa to 50 kDa. However, clinical investigation of possible beneficial effects of a comprehensive increase in LMWP extraction has been frustrated by an inability of currently available extracorporeal dialysis techniques, and hemodialyzers, to deliver such an increase without also causing excessive loss of albumin.

So-called intradialytic clearance of small solutes, such as urea, is largely diffusive; whereas the clearance of larger solutes, including LMWP, is more dependent upon convection. The convective clearance of a solute depends upon ultrafiltration (UF) and the convection coefficient(S). Unlike a sieving coefficient, which is influenced both by diffusive and convective solute flux, S is a theoretical construct which corresponds to the proportion of a solute that co-translocates with its solvent.

Apart from the size of the solute molecule itself, the value of S is influenced by average pore size, the variation in pore size and the distribution of transmembrane solvent flux between different sized pores.

The maximum blood volume flow rate available from the vascular access of dialysis patients generally limits therapeutic ultrafiltration rates to no more than the median glomerular filtration rates found in patents with normal renal function, 87.9 ml/min/1.73 m² in women; and 95.9 ml/min/1.73 m² in men respectively.

Given aggregate weekly treatment times of typically twelve to fifteen hours, extracorporeal dialysis techniques are at an automatic disadvantage when compared to normal levels of renal excretory function, with regard to the aggregate weekly clearance of LMWP. Some mitigation of this disadvantage can be achieved by using hemodialyzer membranes with sieving coefficients for LMWP that are higher than those of a glomerular membrane barrier (GMB). A drawback of using such hemodialyzer membranes is the concomitant loss of albumin whose normal renal turnover is only 600 milligrams per day.

PRIOR ART

Studies using dextran have shown that a maximum negative slope of the curvilinear relationship between sieving coefficient and molecular weight is appreciably less for medium cut off (MCO) membranes in vitro than for a rat GMB in vivo.

Figure 1:
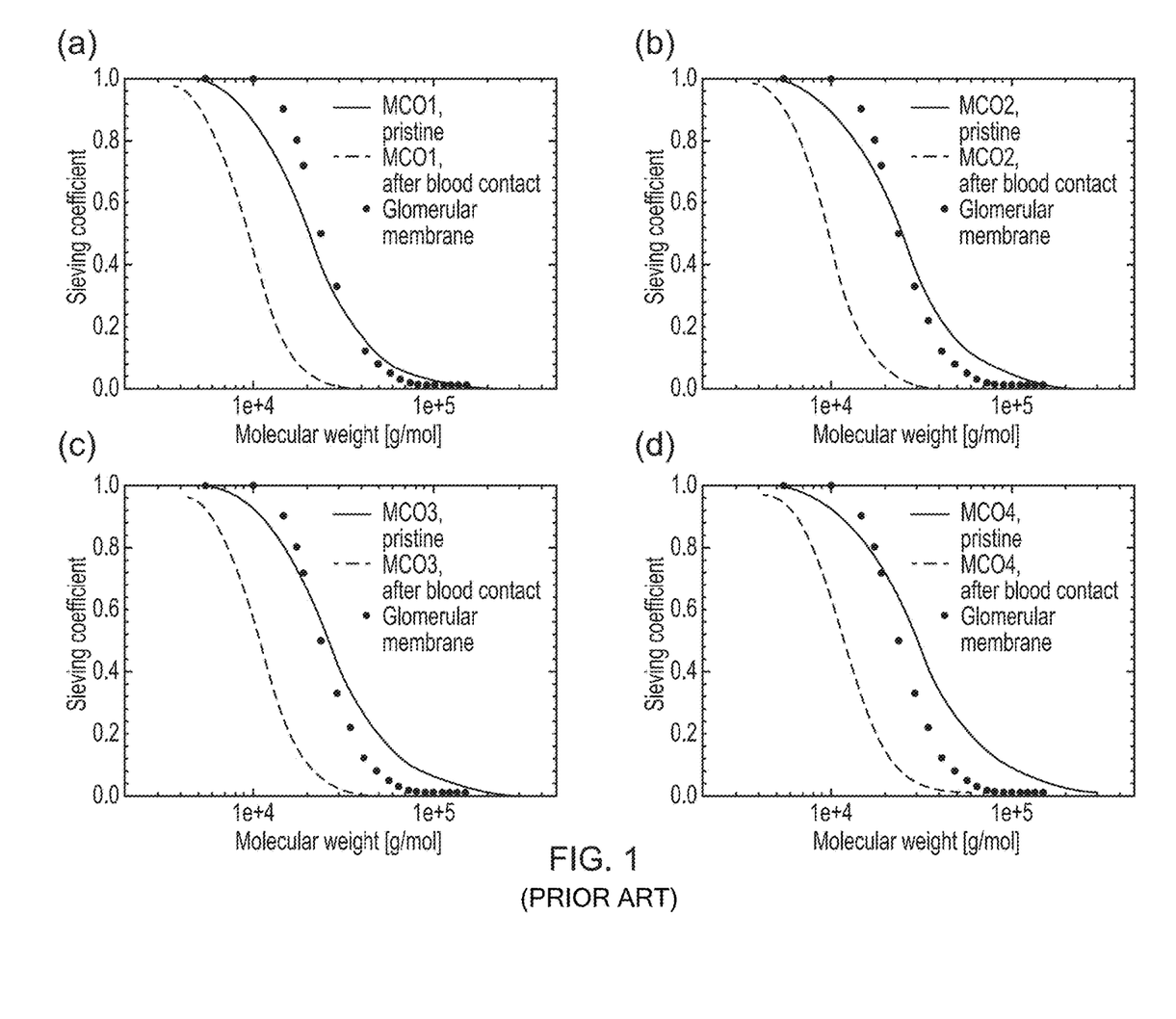
FIG. 1 (PRIOR ART) shows graphs of sieving coefficients against molecular weight of different molecules.

FIG. 1 (PRIOR ART) shows in vitro Dextran sieving curves for MCO membranes before (solid lines) and after (dashed lines) blood contact with thein vivo Dextran sieving curve for the rat GMB superimposed for comparison (dotted lines), (a) MCO 1, (b) MCO 2, (c) MCO 3 and (d) MCO 4. The higher the 'MCO' number, the greater the membrane porosity. The logscale difference between the molecular weight of dextran molecules at retention onset (sieving coefficient 0.9) and cut-off (sieving coefficient 0.1) was greater for the MCO membranes in all cases.

A challenge facing hemodialyzer membrane manufacturers is to find a way to reduce the magnitude of the difference in molecular weight between retention onset and cut-off so that the convection of larger LMWP can be increased without a concomitant increase in the convection of large plasma proteins, especially albumin. To achieve this using single membranes would require an increase in the mean of the membrane pore distribution to be accompanied by a reduction in the variance.

However, an increase in mean pore size that is not accompanied by a reduction in pore size variance results in an increase in the number of larger pores that are capable of admitting albumin and ultimately an increase in the albumin sieving coefficient. Furthermore, the albumin sieving coefficient of a membrane not only depends on the proportion of pores that are large enough to admit albumin but also on the proportion of total transmembrane fluid flux that passes through those larger pores.

The distribution of transmembrane fluid flux between different-sized pores depends on their relative frequency and their comparative resistance to flow. The Hagen-Poiseuille equation for laminar flow in a cylindrical pipe links resistance to flow with the inverse of the fourth power of the radius. On this basis a relatively small proportion of the total number of pores, comprising those of greatest size, could account for a relatively large proportion of total transmembrane fluid flux.

Figure 2:
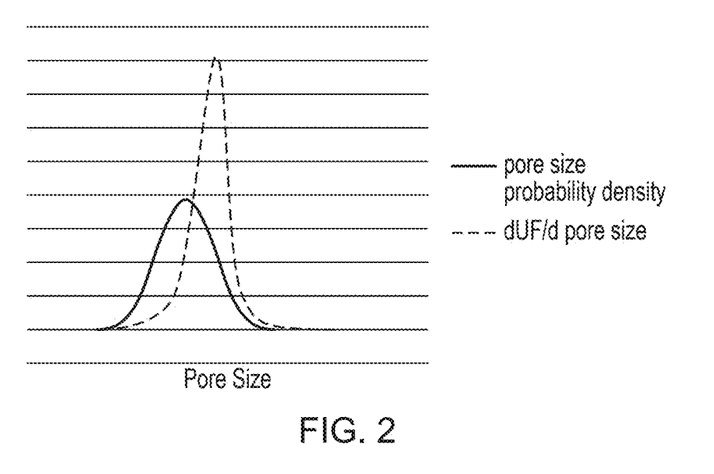
FIG. 2 is a graph of probability density against membrane pore size and the differential of normalized total membrane ultrafiltration rate against membrane pore size.

This is illustrated in FIG. 2 which illustrates pore size probability density function of a hemodialysis membrane (darker line) and dUF/d pore size pore size for the same membrane (fainter line) where the total area under the curve (total UF) has been normalized. The fainter line in FIG. 2 is shifted to the right of the darker line and has a higher peak because larger pores transmit more fluid than smaller ones.

Figure 3:
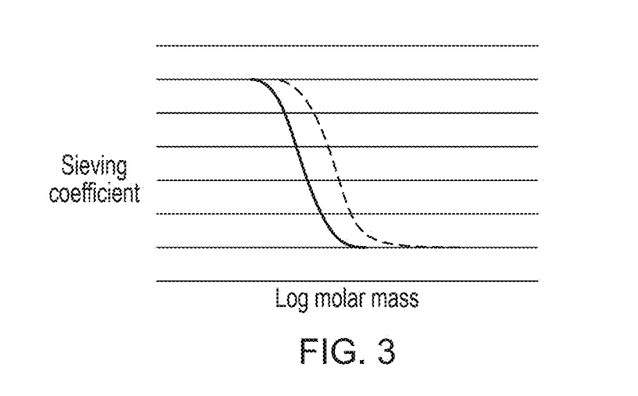
FIG. 3 is a graph of sieving coefficient against molecular size.

The effect of the shift between pore size distribution and fluid transmission (FIG. 2) on the sieving coefficient curve of a hemodialysis membrane is illustrated in FIG. 3. The darker line in FIG. 3 is a sketch of a theoretical sieving coefficient curve based on the false assumption that the rate of fluid flux through individual pores in the membrane does not increase with pore size. The fainter line accords with the fact that larger pores transmit more fluid than smaller ones.

Consequently, the reduction in the sieving coefficient ratio (LMWP:albumin) seen in more porous membranes occurs in part because of the greater proportion of pores whose apertures are sufficiently large to allow albumin to pass through them but also because of the increase in the proportion of total transmembrane fluid flux that passes through those larger pores.

Concomitant loss of albumin prevents the use of conventional dialysis machines with more porous, protein-losing membranes to increase the convection of larger LMWP.

The present invention arose to address this problem.

Another aim of the present invention is to increase the extraction of protein bound uremic toxins (PBUT) whose removal by prior art hemodialysis techniques was limited by their binding to albumin and other large plasma proteins.

SUMMARY OF THE INVENTION

According to a first aspect of the invention there is provided a hemodialysis apparatus for ultrafiltering blood from a patient includes: at least a first, at least a second and at least a third pump and, a first dialyzer circuit which includes a first hemodialyzer with a first hemodialyzer membrane which filters blood that is forced by the at least first pump and the at least second pump; and the at least third pump and the at least a fourth pump which are operative to separate plasma protein bound and unbound uremic toxins from the blood into a dialysate to form a hemodiafiltrate, characterized in that a second dialzser circuit facilitates dissociation of plasma protein bound uremic toxins and includes at least a fifth pump and a second hemodialyzer with a second hemodialyzer membrane which separates uremic toxins from plasma protein by ultrafiltration to a residue of hemodiafiltrate containing concentrated plasma protein for recirculation to the patient.

In some embodiments the second hemodialyzer ultrafilters at least 90% of the volume of the filtered hemodiafiltrate passing therethrough.

In some embodiments the second hemodialyzer is operative to return at least 3% of protein concentrated hemodiafiltrate to a venous side of the extracorporeal blood circuit.

In some embodiments the at least a third pump is operative to allow the operator to control the volume flow rate of hemodiafiltrate that is passed to the second hemodialyzer.

In some embodiments the at least fourth pump is operative to allow the operator to control the proportion of hemodiafiltrate that is infused back into the patient via the venous (return) side of the extracorporeal circuit.

In some embodiments operation of the at least a fifth pump is pressure activated so as to ensure that the hydraulic pressure in the section of the fluid pathway, between the at least a third pump and the at least a fourth pump, is maintained within the limits required to guarantee the volumetric accuracy, during operation, of the at least third pump and the at least fourth pump.

In some embodiments at least a first balance chamber and at least a second balance chamber are connected respectively to the second pump and at least a seventh pump. This arrangement ensures that the volume flow rate of HDF replacement fluid required to achieve the volume flow rate of net fluid removal from the extracorporeal blood circuit set by the operator of the invention enters the first dialyzer circuit thence to be infused into the patient, via the venous side of the extracorporeal blood circuit.

Ideally the at least a first balance chamber and the at least a second balance chamber and the at least second pump and at least a seventh pump operate to ensure a volume flow rate of HDF replacement fluid, which is required to achieve the volume flow rate of net fluid removal from the extracorporeal blood in dependence upon operator specified criteria, enters the first dialyzer circuit for infusion into a venous side of an extracorporeal blood circuit.

In some embodiments the first balance chamber is connected to the at least a second pump and to the at least a fifth pump, the at least a first balance chamber ensures correct volume flow rates for the hemodiafiltrate infused back into the patient in the event of a failure of calibration of a pump connected thereto. The at least fifth pump is pressure activated to maintain downstream hydraulic pressure at a level sufficient to support balanced flow (d) with the at least a second pump in the at least first balance chamber.

The at least a sixth pump is connected to an output of the second hemodialyzer and is operative to allow the operator of the dialysis apparatus to control the volume flow rate of net fluid removal from the extracorporeal blood circuit (y).

In some embodiments the at least a second balance chamber is connected to the first balance chamber and to the at least a third pump and is operative to ensure that the volume flow rate of hemodiafiltrate is at least equal to the volume flow rate of incoming fresh dialysate. In some embodiments the at least a fourth pump is operative to allow the operator of the invention to set the ultrafiltration volume flow rate in the first hemodialyzer.

It is understood that redundancy pumps may be included in order to switch automatically in the event of a pump failure.

Sensors are provided and are operative to transmit a signal indicative of hydraulic pressure in the first and the second dialyzer circuits.

Advantageously a processor is operative to receive signals from sensors, and a controller provides an operator of the invention a means to vary the proportion of the volume flow rate of hemodiafiltrate to a venous side of the extracorporeal blood circuit.

Optionally sensors are provided to transmit signals to the processor from the group comprising: a pumping pressure, a pumping speed, a saline concentration, an electrical conductance and a concentration of a solute in hemodiafiltrate. The processor, operating via a controller, may be configured to vary automatically the volume of ultrafiltered hemodiafiltrate in the second hemodialyzer and the proportion of the protein concentrated hemodiafiltrate for infusion into the venous side of the extracorporeal blood circuit.

The dialysis apparatus may include a sensor which is operative to sense a state of a membrane performance with treatment time and/or to sense a risk of membrane rupture and/or is operative to trigger an alarm. A sensor may be provided to sense back filtration in the secondary hemodialyzer and is operative to trigger an alarm. At least one pressure sensor may provide a signal to the processor to initiate pulses of raised pressure in the dialysate compartments of the first and second hemodialyzers. An advantage of this is to prevent fouling and loss of hemodialyzer performance.

In particularly preferred embodiments a filtration membrane is housed within a removable cartridge. The cartridge is ideally dimensioned and arranged so as to be compatible only with operation according to the present invention, thereby ensuring that the correct cartridge is only ever able to be used with the appropriate dialysis apparatus.

In some embodiments at least one monitor is provided that is operative to monitor preset patient criteria and to trigger an alarm in the event that a criterion is not satisfied.

Optionally a memory records a patient's details, a start and end time, operational data relating to pumping data and other aspects of a patient's dialysis treatment.

According to a second aspect of the invention there is provided a method of ultra-filtering human or animal blood using the aforementioned hemodialysis apparatus and when deployed to filter extracorporeal blood.

Preferred embodiments of the invention will now be described, with reference to the Figures generally and with specific reference to the embodiments shown in FIGS. 4 and 5 in which:

DETAILED DESCRIPTION OF PREFERRED EMBODIMENTS OF THE INVENTION

Figure 4:
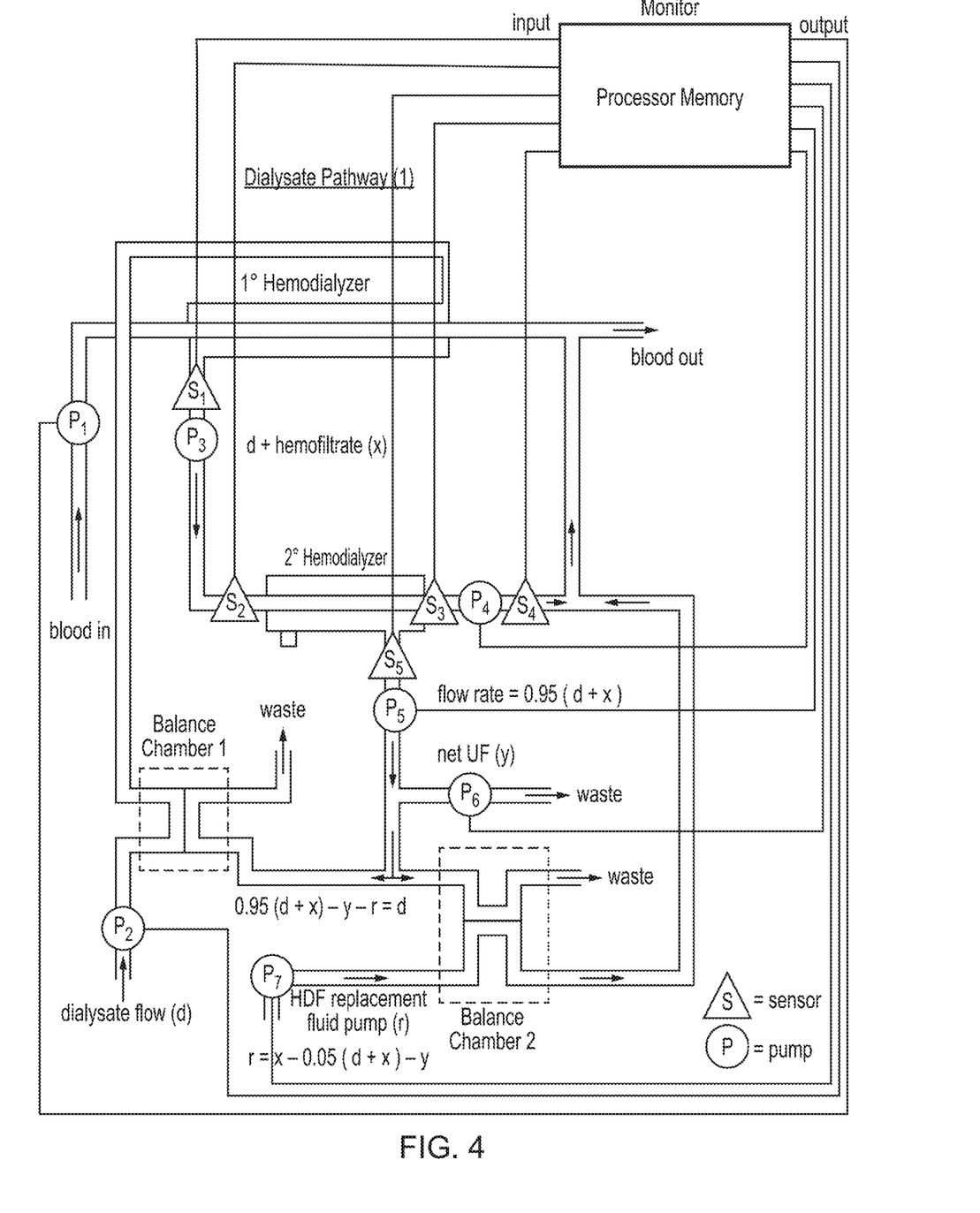
FIG. 4 is a functional block diagram of one embodiment of a dialysis apparatus which ultra-filters blood and to a related method of ultra-filtering blood ex-vivo.
Figure 5:
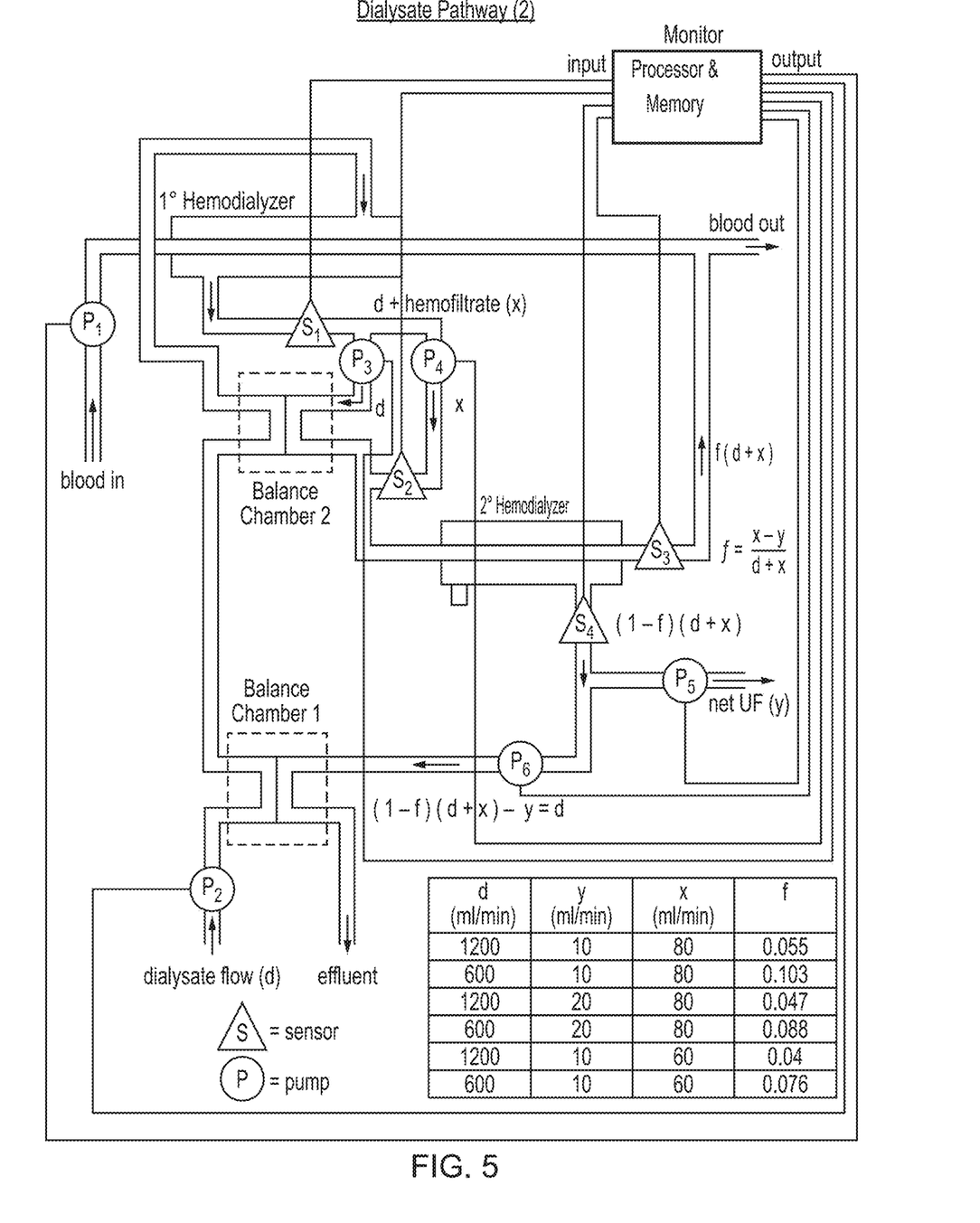
FIG. 5 is functional block diagram of a second embodiment of a dialysis apparatus which ultra-filters blood and to a related method of ultra-filtering blood ex-vivo.

Referring to FIGS. 4 and 5, which each show alternative embodiments of the dialysis apparatus, comprises two dialyzer circuits, the first departs from prior art HDF only in that the first hemodialyzer may consist of an MCO, HCO or other protein-losing membrane.

In the second dialyzer circuit the effluent hemodiafiltrate from the first hemodialyzer/dialysis circuit passes through the "blood compartment" of a second MCO or HCO hemodialyzer. Ultrafiltration of between 90% and 97% of the volume of hemodiafiltrate passing through the hemodialyzer leaves 3% to 10% of protein concentrated hemodiafiltrate for reinfusion into the venous/return side of the extracorporeal blood circuit.

The proportion of the volume of hemodiafiltrate ultrafiltered in the second hemodialyzer (1−f) and therefore the proportion infused into the venous side of the extracorporeal blood circuit (f) is a modifiable parameter. The mechanism by which this parameter is set differs between the two preferred embodiments of the dialysate/hemodiafiltrate fluid pathway shown in FIGS. 4 and 5 whose control algorithms are as follows:

FIG. 4, First Embodiment Pathway (1)
1. Operator set blood pump ($P_1$) volume flow rate
2. Operator set first hemodialyzer ultrafiltration rate (x) according to blood flow within safety constraints programmed into the processor
3. Operator set dialysate inflow pump ($P_2$) volume flow rate (d)
4. Processor set first hemodialyzer HDF pump ($P_3$)=(d+x)
5. Operator set f (0.05 in the example shown in FIG. 4)
6. Processor set second hemodialyzer outflow pump ($P_4$)=0.05 (d+x)
7. Operator set patient net ultrafiltration pump ($P_6$) volume flow rate (y)
8. Processor set HDF replacement fluid pump ($P_7$)=x−y−0.05 (d+x)
9. Allow pressure sensor driven processor adjustments to P4, within a certain tolerance, so that flow in the system remains continuous FIG. 5, Second Embodiment Pathway (2)
1. Operator set blood pump ($P_1$) volume flow rate
2. Operator set first hemodialyzer ultrafiltration rate (x) according to blood flow within safety constraints programmed into the processor
3. Operator set dialysate inflow pump ($P_2$) volume flow rate (d)
4. Processor set first hemodialyzer dialysate/ultrafiltration pumps ($P_3/P_4$) to d and x respectively
5. Operator set patient net ultrafiltration pump ($P_6$) volume flow rate (y)

In the First Embodiment f is preset by the machine operator (0.05 in the example shown in FIG. 4). In the second pathway f is not preset but follows automatically from the operator of the dialysis apparatus choice of x, y and d.

Both embodiments incorporate at least two balance chambers. These (or an equivalent technical device) are essential for ensuring correct volume flow rates for the dialysate/hemodiafiltrate and to guarantee patient safety in the event of major loss of calibration of any of the pumps. A balance chamber effectively comprises a volume separated into two portions by a membrane. It is appreciated that two pairs of balance chambers operate in tandem.

Theoretical Explanation

Despite the technical differences between these two Embodiments the same mathematical model can be applied to the analysis of solute extraction. A unidimensional model of the HDF process in the first hemodialyzer and the subsequent ultrafiltration of the hemodiafiltrate in the second hemodialyzer is presented in the following paragraphs.

The membrane transfer of solutes, such as albumin, with very low mass transfer coefficients, even across the more permeable types of membrane, may be analyzed as being solely due to convection.

If: $v_x$=the volume flow per unit time of the remaining hemodiafiltrate (≅water volume flow rate for dilute solutions) at a point (x) located along the "blood compartment" of the second hemodialyzer
$m_x$=the mass of solute passing x per unit time
then $m_x/v_x=C_x$=the solute concentration at x For present purposes, an expression linking solute extraction to the cumulative level of ultrafiltration, without reference tox, will suffice. The expression can be derived by analyzing the solute mass flow rate at positions along the blood compartment of the secondary hemodialysis in terms of $m_v$, where v represents the remaining hemodiafiltrate volume flow rate.

As $\delta v \to 0$ ($\delta v$ being positive in the direction opposite to the flow of hemodiafiltrate)
$m_{v-\delta v} \to m_v - S(m_v/v)\delta v$ $$\delta C_v = C_v - C_{v-\delta v} = m_v/v[(S-1)\delta v/v - \delta v] \cong C_v[(S-1)\delta v/v]$$

where S=the convection coefficient of the solute and:

$$\int_{C_{vi}}^{C_{vi}} \delta C_v/C_v = (S-1)\int_v^{vi} \delta v/v$$

where $v_i$ is the initial volume flow rate of the hemodiafiltrate in the second hemodialyzer $$\ln C_{v_i} - \ln C_v = (S-1)(\ln v_i - \ln v)$$

$$\ln C_v - \ln C_{v_i} = (S-1)(\ln v - \ln v_i)$$

$$C_v/C_{v_i} = (v/v_i)^{S-1}$$

Letting $$f = \frac{v}{v_i}$$

where $f$ is the proportion of hemodiafiltrate returned to the patient.

$$\frac{C_v}{C_{v_i}} = f^{S-1}$$

$$\text{Extraction } (E) = 1 - f\left(\frac{C_v}{C_{v_i}}\right) = 1 - f^S$$

As an example, if 50 L of plasma with an albumin concentration of 40 g/l passes through the first hemodialyzer with an albumin extraction of 0.01, 20 g of albumin will pass into the hemodiafiltration. If this hemodiafiltrate is then passed through a second hemodialyzer in which S for albumin=0.02 and f=0.05, albumin extraction is 0.058 and only 1.16 g of the original 20 g of albumin in the hemodiafiltrate is ultimately lost.

Analysis of ultrafiltration of hemodiafiltration with regard to the extraction of smaller, more diffusible, LMWP for whom S is less than unity requires a model that takes account of both convection and diffusion.

The ultrafiltration process in the second hemodialyzer may be configured such that the flow of ultrafiltrate runs in a concurrent or countercurrent direction with respect to the flow of the hemodiafiltrate. In either case, given dynamic equilibrium, the sum of the solute fluxes entering and leaving any small segment of the blood compartment between two points (x and x+$\delta$x) along the active portion of the second hemodialyzer must equal zero, where $x_0$ is the beginning of the active portion and x is positive in the direction of flow of the hemodiafiltrate. $Q_x$, the hemodiafiltrate volume flow rate, will change with x because of ultrafiltration, as will $C_x$ the concentration of the solute. $Qe_x$ and $Ce_x$ correspond to the volume flow rate and solute concentration respectively in the ultrafiltrate compartment of the second hemodialyzer.

The solute mass conservation equation within the "blood compartment" of the second hemodialyzer at dynamic equilibrium accords with the equation previously derived for prior art HDF:

Letting $q_{UF(x)}$=the ultrafiltration volume flow rate per unit length of hemodialyzer at x K=the mass transfer (diffusion) coefficient per unit length of hemodialyzer at x As $\delta x \to 0$:

$$Q_x C_x - (Q_x - q_{UF(x)}\delta x)C_{x+\delta x} - q_{UF(x)} S \left( \frac{C_x e^{\frac{q_{UF(x)}S}{K}} - Ce_x}{e^{\frac{q_{UF(x)}S}{K}} - 1} \right) \delta x \cong 0 \quad 1$$

$$Q_x C_x \cong (Q_x - q_{UF(x)}\delta x)(C_x + \delta C_x) + q_{UF(x)} S \left( \frac{C_x e^{\frac{q_{UF(x)}S}{K}} - Ce_x}{e^{\frac{q_{UF(x)}S}{K}} - 1} \right) \delta x$$

$$\delta C_x \cong \frac{q_{UF(x)}\delta x}{Q_x - q_{UF(x)}\delta x}\left[ C_x - S\left( \frac{C_x e^{\frac{q_{UF(x)}S}{K}} - Ce_x}{e^{\frac{q_{UF(x)}S}{K}} - 1} \right) \right].$$

$C_x$ can therefore be derived by numerical integration starting with $C_{x_0}$ as long as $Q_x$, $q_{UF(x)}$ and $Ce_x$ can be defined. When the value of S is less than unity, using $C_x$ to calculate $\delta C_x$ between x and x+$\delta$x tends to underestimate solute extraction. The degree of error is reduced by splitting the active portion of the hemodialyzer into a large number of segments (two hundred in the case of the analysis underlying the results presented in Table 1).

In the case of concurrent flow, $Ce_x$ can be derived from the boundary conditions:

$$Q_x + Qe_x = Q_{x_0}$$
$$Q_x C_x + Qe_x Ce_x = Q_{x_0} C_{x_0}$$

so that:

$$Ce_x = \frac{Q_{x_0} C_{x_0} - Q_x C_x}{Q_{x_0} - Q_x}$$

$Q_x$ and $q_{UF(x)}$ are related by the fact that $$q_{UF(x)} = -\frac{dQ_x}{dx}.$$

The overall ultrafiltration rate is set by the product of (1–f) and the volume flow rate of the hemodiafiltrate. The distribution of ultrafiltration along the length of the second hemodialyzer is set by the ratio between two hydraulic coefficients, one governing the volume flow rate of the hemodiafiltrate, the other the ultrafiltration rate across the membrane.

As the hemodiafiltrate passes through the "blood compartment" of the second hemodialyzer its protein solute content becomes progressively more concentrated. It is assumed ere that this increase in protein concentration has a negligible effect on viscosity and that:

$$Q_x = -k\frac{dP_x}{dx}. \quad 2$$

where $P_x$=the hydraulic pressure within the blood compartment. (At $x_0$ a typical albumin concentration within hemodiafiltrate would be of the order of one hundredth of that in the plasma, rising to a little less than a fifth at the end of the active second hemodialyzer if f=0.05.)

The loss of hemodiafiltrate from the "blood compartment" of the second hemodialyzer due to ultrafiltration is given by:

$$\frac{dQ_x}{dx} = -h(P_x - P_e). \quad 3$$

where h is the hydraulic conductivity per unit length of hemodialyzer, whose actual numerical value, as with that of k, can come from experimental observation. It is assumed that the ultrafiltrate compartment of the second hemodialyzer provides a considerably lower resistance pathway for longitudinal fluid flow than the fibre lumina and therefore that the negative hydraulic pressure ($P_e$) required for ultrafiltration remains relatively constant throughout that compartment.

(In support of this assumption, the technical datasheet accompanying the Baxter Corporation Theranova MCO hemodialyzer indicates a pressure drop in the blood compartment with bovine blood and $Q_b$=300 ml/min of ≤130 mmHg. The pressure drop in the dialysate compartment with $Q_D$=500 ml/min is quoted as ≤30 mmHg.)

From equation 3:

$$\frac{d^2 Q_x}{dx^2} = -h\frac{dP_x}{dx}$$

Combining with equation 2:

$$\frac{d^2 Q_x}{dx^2} = \frac{h}{k} Q_x$$

This has a general solution:

$$Q_x = A e^{-\left(\frac{h}{k}\right)^{\frac{1}{2}} x} + B e^{\left(\frac{h}{k}\right)^{\frac{1}{2}} x}$$

A and B can be determined from the following boundary conditions:

$Q_x = Q_{x_0}$ when $x = x_0$ $Q_{x_L} = f Q_{x_0}$ when $x = L$, where $L$=the length of the active portion of the hemodialyzer $A + B = Q_{x_0}$ therefore:

$$A = Q_{x_0} \left[ \frac{e^{\left(\frac{h}{k}\right)^{\frac{1}{2}} L} - f}{e^{\left(\frac{h}{k}\right)^{\frac{1}{2}} L} - e^{-\left(\frac{h}{k}\right)^{\frac{1}{2}} L}} \right]$$

and $$B = Q_{x_0} \left[ \frac{f - e^{-\left(\frac{h}{k}\right)^{\frac{1}{2}} L}}{e^{\left(\frac{h}{k}\right)^{\frac{1}{2}} L} - e^{-\left(\frac{h}{k}\right)^{\frac{1}{2}} L}} \right]$$

Numerical integration of equation 1 provides the value for $C_{x_L}$ and the extraction of solute from hemodiafiltrate=

$$E = 1 - f \frac{C_{x_L}}{C_{x_0}}$$

For countercurrent flow the boundary conditions for mass conservation within the hemodialyzer are:

$$C_x Q_x - C_{x_L} Q_{x_L} = C e_x Q e_x$$
$$C e_{x_0} Q e_{x_0} + C_{x_L} Q_{x_L} = C_{x_0} Q_{x_0}$$
$$C_{x_0} Q_{x_0} - C_x Q_x = C e_{x_0} Q e_{x_0} - C e_x Q e_x$$

Combining the first and second of these boundary conditions and then subtracting the third gives:

$$Ce_x = \frac{C_x Q_x - C_{x_L} Q_{x_L}}{Q_x - Q_{x_L}}$$

This can be used to provide values of $Ce_x$ for numerical integration given a certain value for $C_{x_L}$. An iterative process is therefore required which, in achieving internal consistency as to $C_{x_L}$, establishes its correct value. For larger LMWP, whose extraction is the main focus of the dialysis apparatus and for whom convection is a more important mechanism, calculations show that whether the hemodiafiltrate and ultrafiltrate are directed to run in concurrent or countercurrent directions makes very little difference to the extraction values produced by the model.

Predictions of In Vivo Solute Extraction

To illustrate the impact of this technique on solute extraction using MCO and/or HCO hemodialyzers, values of $K_o A$ and S, taken to be representative of four molecular size classes, were tested using the mathematical model. The four classes of molecule were: small solutes (for example phosphate), smaller LMWP (e.g. B2 microglobulin), larger LMWP (e.g. interleukin 6) and large plasma proteins (e.g. albumin). The values of $K_o A$ and S assigned to the various hemodialyzer/solute molecular class combinations were estimated using the product information sheets and promotional literature pertaining to the Nippro Elisio High Flux hemodialyzer, the Theranova MCO hemodialyzer (Baxter Healthcare Corporation) and the SepteX HCO hemodialyzer (Gambro-Baxter, Hechingen, Germany) and the results of an earlier study.

For this illustration the direction of flow of the hemodiafiltrate in the second hemodialyzer is taken to be concurrent with that of the ultrafiltrate. For all four classes of molecule, it has been assumed that the effective distribution volume, at least for the duration of a single transit of the hemodialyzer, is the plasma water.

Example volume flow rate parameters chosen for the illustration were a plasma water volume flow rate ($Q_{b_e}$) of 200 ml/min, dialysate volume flow rates (d) of 600 ml/min or 1200 ml/min and a primary hemodialyzer hemofiltration rate (x) of 70 or 80 ml/min. The internal filtration rates (IFR) of the three types of hemodialyzer were set at different levels to reflect their differing hydraulic conductivities. The patient net ultrafiltration rate was set to either zero or 10 ml/min as shown.

Three different combinations of these volume flow rate parameters were studied using the model. The results shown in Table 1 were calculated on the assumption that Pathway 1 was operative whereas in Tables 2 and 3 Pathway 2 was operative.

In the absence of actual experimental data, as a guide to the relationship between $Q_x$ and distance (x) along the second hemodialyzer, estimates of the two hydraulic coefficients k and h (see above) were derived as follows:

Assuming a distance-averaged volume flow rate of circa 300 cm³/min in the blood compartment and an overall pressure gradient of 100 mmHg along a hemodialyzer of 20 cm active length, equation 2 was used to provide an estimate of k=60 cm⁴/mmHgmin.

Assuming an average ultrafiltration rate of 30 cm³/min per cm of active hemodialyzer with a uniform negative dialysate compartment pressure of −300 mmHg and an average positive pressure within the fibre lumina of +50 mmHg, equation 3 was used to provide an estimate of h=(30/350) cm²/mmHg min.

TABLE 1

(Pathway 1) A comparison of the extraction of solutes of differing molecular weight by HDF using High Flux (HF), Medium Cut Off (MCO) and High Cut Off (HCO) haemodialyzers (first three columns) and (last three columns) the dialysis apparatus utilises Dialysate Pathway 1 (primary and secondary haemodialyzers as shown, 95% ultrafiltration of haemodiafiltrate, reinfusion of the residual 5%).

$Q_{b_e}$ = 200 ml/min
d = 600 ml/min
x = 70 ml/min
f = 0.05
(net UF = 0)

| | Single HF IFR = 20 ml/min | | | Single MCO IFR = 30 ml/min | | | Single HCO IFR = 40 ml/min | | | Dual MCO | | Dual HCO | | HCO primary with MCO secondary | |
|---|---|---|---|---|---|---|---|---|---|---|---|---|---|---|---|
| | $K_oA$ | S | $E_1$ | $K_oA$ | S | $E_1$ | $K_oA$ | S | $E_1$ | $E_2$ | $E_1 \cdot E_2$ | $E_2$ | $E_1 \cdot E_2$ | $E_2$ | $E_1 \cdot E_2$ |
| Small molecule (e.g. PO$_4$) | 500 | 1 | 0.953 | 700 | 1 | 0.986 | 1000 | 1 | 0.998 | 0.95 | 0.937 (98% of single HF) | 0.95 | 0.948 (99% of single HF) | 0.95 | 0.948 (99% of single HF) |
| Smaller LMWP (e.g. β2M) | 40 | 0.6 | 0.351 | 80 | 1 | 0.559 | 160 | 1 | 0.745 | 0.95 | 0.531 (151% of single HF) | 0.95 | 0.708 (202% of single HF) | 0.95 | 0.708 (202% of single HF) |
| Larger LMWP (e.g. IL6) | 2 | 0.2 | 0.089 | 6 | 0.6 | 0.256 | 18 | 0.7 | 0.342 | 0.833 | 0.213 (239% of single HF) | 0.876 | 0.300 (337% of single HF) | 0.833 | 0.285 (320% of single HF) |
| Large plasma proteins e.g. albumin | 0 | 0.002 | 0.00092 | 0.2 | 0.02 | 0.0102 | 0.6 | 0.053 | 0.0304 | 0.057 | 0.00058 (63% of single HF) | 0.145 | 0.0044 (478% of single HF) | 0.057 | 0.00173 (188% of single HF) |
| Expected albumin loss per session assuming 48 litres of plasma processed and average [albumin] 40 g/l | | 1.77 grams | | | 19.6 grams | | | 58.4 grams | | | 1.11 grams | | 8.45 grams | | 3.32 grams |

$E_1$ = solute extraction by the primary haemodialyzer, $E_2$ = solute extraction by ultrafiltration of the haemodiafiltrate in the secondary haemodialyzer, $E_1 \cdot E_2$ = overall solute extraction. $K_oA$ = mass transfer area coefficient (ml/min), S = convection coefficient, $Q_{b_e}$ = plasma volume flow rate, d = volume flow rate of fresh dialysate, x = primary haemodialyzer haemofiltration rate, IFR = internal filtration rate.

TABLE 2

(Pathway 2) A comparison of the extraction of solutes of differing molecular weight by HDF using high flux (HF), medium cut off (MCO) and high cut off (HCO) haemodialyzers (first three columns) and (last three columns) the dialysis apparatus n incorporating Dialysate Pathway2 (primary and secondary haemodialyzers as shown, 89.7% ultrafiltration of haemodiafiltrate, reinfusion of the residual 10.3%).

$Q_{b_e}$ = 200 ml/min
d = 600 ml/min
x = 80 ml/min
f = 0.103
net UF = 10 ml/min

| | Single HF IFR = 20 ml/min | | | Single MCO IFR = 30 ml/min | | | Single HCO IFR = 40 ml/min | | | Dual MCO | | Dual HCO | | HCO primary with MCO secondary | |
|---|---|---|---|---|---|---|---|---|---|---|---|---|---|---|---|
| | $K_oA$ | S | $E_1$ | $K_oA$ | S | $E_1$ | $K_oA$ | S | $E_1$ | $E_2$ | $E_1 \cdot E_2$ | $E_2$ | $E_1 \cdot E_2$ | $E_2$ | $E_1 \cdot E_2$ |
| Small molecule (e.g. PO$_4$) | 500 | 1 | 0.960 | 700 | 1 | 0.989 | 1000 | 1 | 0.999 | 0.90 | 0.890 (93% of single HF) | 0.90 | 0.899 (94% of single HF) | 0.90 | 0.899 (94% of single HF) |
| Smaller LMWP (e.g. β2M) | 40 | 0.6 | 0.379 | 80 | 1 | 0.590 | 160 | 1 | 0.769 | 0.90 | 0.531 (140% of single HF) | 0.90 | 0.692 (183% of single HF) | 0.90 | 0.692 (183% of single HF) |
| Larger LMWP (e.g. IL6) | 2 | 0.2 | 0.104 | 6 | 0.6 | 0.287 | 18 | 0.7 | 0.374 | 0.743 | 0.213 (205% of single HF) | 0.796 | 0.298 (287% of single HF) | 0.743 | 0.278 (267% of single HF) |
| Large plasma proteins e.g. albumin | 0 | 0.002 | 0.0011 | 0.2 | 0.02 | 0.0117 | 0.6 | 0.053 | 0.0342 | 0.044 | 0.0005 (45% of single HF) | 0.113 | 0.0039 (355% of single HF) | 0.044 | 0.0015 (136% of single HF) |
| Expected albumin loss per session assuming 48 litres of plasma processed and average [albumin] 40 g/l | | 2.11 grams | | | 22.4 grams | | | 65.7 grams | | | 0.96 grams | | 7.49 grams | | 2.88 grams |

$E_1$ = solute extraction by the primary haemodialyzer, $E_2$ = solute extraction by ultrafiltration of the haemodiafiltrate in the secondary haemodialyzer, $E_1 \cdot E_2$ = overall solute extraction. $K_oA$ = mass transfer area coefficient (ml/min), S = convection coefficient, $Q_{b_e}$ = plasma volume flow rate, d = volume flow rate of fresh dialysate, x = primary haemodialyzer haemofiltration rate, IFR = internal filtration rate.

TABLE 3

(Pathway 2) A comparison of the extraction of solutes of differing molecular weight by HDF using High Flux (HF), Medium Cut Off (MCO) and High Cut Off (HCO) haemodialyzers (first three columns) and (last three columns) the dialysis apparatus incorporates Dialysate Pathway 2 (primary and secondary haemodialyzers as shown, 94.5% ultrafiltration of haemodiafiltrate, reinfusion of the residual 5.5%).

$Q_{b_e}$ = 200 ml/min
d = 1200 ml/min
x = 80 ml/min
f = 0.055 net UF = 10 ml/min

| | Single HF IFR = 20 ml/min | | | Single MCO IFR = 30 ml/min | | | Single HCO IFR = 40 ml/min | | | Dual MCO | | Dual HCO | | HCO primary with MCO secondary | |
|---|---|---|---|---|---|---|---|---|---|---|---|---|---|---|---|
| | $K_oA$ | S | $E_1$ | $K_oA$ | S | $E_1$ | $K_oA$ | S | $E_1$ | $E_2$ | $E_1 \cdot E_2$ | $E_2$ | $E_1 \cdot E_2$ | $E_2$ | $E_1 \cdot E_2$ |
| Small molecule (e.g. $PO_4$) | 500 | 1 | 0.969 | 700 | 1 | 0.993 | 1000 | 1 | 0.999 | 0.945 | 0.938 (97% of single HF) | 0.945 | 0.944 (97% of single HF) | 0.945 | 0.944 (97% of single HF) |
| Smaller LMWP (e.g. β2M) | 40 | 0.6 | 0.377 | 80 | 1 | 0.594 | 160 | 1 | 0.777 | 0.945 | 0.561 (149% of single HF) | 0.945 | 0.734 (195% of single HF) | 0.945 | 0.734 (195% of single HF) |
| Larger LMWP (e.g. IL6) | 2 | 0.2 | 0.101 | 6 | 0.6 | 0.284 | 18 | 0.7 | 0.371 | 0.823 | 0.234 (232% of single HF) | 0.868 | 0.322 (319% of single HF) | 0.823 | 0.305 (302% of single HF) |
| Large plasma proteins e.g. albumin | 0 | 0.002 | 0.00106 | 0.2 | 0.02 | 0.0114 | 0.6 | 0.053 | 0.033 | 0.056 | 0.00064 (60% of single HF) | 0.141 | 0.0047 (443% of single HF) | 0.056 | 0.00185 (175% of single HF) |
| Expected albumin loss per session assuming 48 litres of plasma processed and average [albumin] 40 g/l | 2.04 grams | | | 21.9 grams | | | 63.4 grams | | | 1.23 grams | | 9.02 grams | | 3.55 grams | |

$E_1$ = solute extraction by the primary haemodialyzer, $E_2$ = solute extraction by ultrafiltration of the haemodiafiltrate in the secondary haemodialyzer, $E_1 \cdot E_2$ = overall solute extraction. $K_oA$ = mass transfer area coefficient (ml/min), S = convection coefficient, $Q_{b_e}$ = plasma volume flow rate, d = volume flow rate of fresh dialysate, x = primary haemodialyzer haemofiltration rate, IFA = internal filtration rate.

These results show that it is possible to increase the extraction of smaller and larger LMWP to varying degrees (with increases of between 51% and 237% in the examples given in Tables 1, 2 and 3) using the dialysis apparatus and to achieve those increases without excessive loss of albumin. The Second Embodiment (Pathway 2) requires twice the volume flow rate of fresh dialysate to achieve similar levels of LMWP as the First Embodiment (Pathway 1) making the latter the likely preferred option from an economic and sustainability perspective.

Although the normal physiological rate of renal albumin loss is only 600 mg per day, daily turnover of albumin is approximately 10 grams. On this basis a thrice weekly albumin loss from therapy of 8.45 grams using two HCO hemodialyzers. The dialysis apparatus might be considered reasonable, however the option that appears to provide the best compromise between higher LMWP extraction and minimal albumin loss involves the use of an HCO membrane as the primary hemodialyzer and an MCO membrane as the secondary hemodialyzer. Under these circumstances, assuming 95% ultrafiltration of hemodiafiltrate with Pathway 1, a minor reduction (1-2%) in the extraction from plasma water of small solutes compared to prior art treatment may be anticipated, however the impact of this reduction on aggregate small solute removal over the entire course of a dialysis treatment session will be marginal, inter compartmental solute kinetics being a far more important limiting factor.

The invention may also be deployed to remove protein bound uremic toxins (PBUT), such as indoxyl sulphate (IS) and p-cresylsulphate (pCS) which are small solutes actively secreted from the peritubular capillary blood of healthy kidneys into the lumen of the proximal tubule. Albumin is the predominant binding protein for these toxins leaving a free fraction of circa 0.1 for IS and 0.07 for pCS. Albumin binding significantly reduces the efficiency of IS and pCS extraction by prior art high flux membrane hemodialysis with or without high volume ultrafiltration. The predominant mechanism(s) by which albumin binding reduces PBUT extraction is uncertain but the conclusion of the analysis presented below is that the effect on volume of distribution (VD) is unlikely to be the sole cause of the modest post treatment reductions in PBUT concentration (20% to 30%) that are observed.

If it is assumed that during hemodialysis treatment PBUT are effectively restricted to the plasma compartment and that the kinetics of their dissociation from albumin and the kinetics of their mass transfer, including those between the blood and dialysate compartments of the hemodialyzer, are not rate limiting then their reduction ratio following a session of hemodialysis treatment can be estimated as follows:

Assuming a total blood volume of 5 L and a haematocrit of 30% the total plasma volume will be 3.5 L. If the free fraction of the PBUT for example CS is taken to be 0.07 its $V_D$ will be approximately:

$$3.5 \times \left(1 + \frac{93}{7}\right) = 50 \text{ L}$$

If the blood volume flow rate to the hemodialyzer were 300 ml/min i.e. 210 ml/min in terms of plasma flow, the dialysate flow rate were 600 ml/min and PBUT mass transfer kinetics were non rate limiting, the extraction of PBUT by the hemodialyzer would be:

$$\frac{600}{600+200\left(1+\frac{93}{7}\right)} = 0.167$$

The above calculation also depends upon the assumption that serum albumin, as part of the $V_D$ of the PBUT, constitutes a non-saturable compartment, at least over the range of PBUT concentrations found in practice. In the absence of any definitive data with respect to albumin PBUT binding capacity, and binding affinities, it is acknowledged that this assumption can only be seen as a first approximation. Assuming single compartment kinetics the equation governing the extraction of PBUT from plasma is therefore:

$$\frac{d[PBUT]}{dt} = \frac{-0.167 \times 201\left(1+\frac{93}{7}\right)}{50,000}[PBUT] = -0.01[PBUT]$$

If a dialysis session were of 240 minutes duration it follows that:

$$\frac{[PBUT]}{[PBUT]_0} = 0.09$$

That is a 91% reduction ratio (RR).

As this level of reduction ratio is not observed in practice using prior art hemodialysis and HDF techniques the assumptions that the effective $V_D$ of PBUT is restricted to the plasma compartment and/or that the kinetics of PBUT albumin dissociation and their mass transfer kinetics, including that across the hemodialyzer, are not limiting factors, must come into question. Approximately 40% of total extracellular albumin is found in the plasma compartment with the remaining 60% in the interstitial fluid. If this extra $V_D$ is included in the reduction ratio calculation (with an additional 10 L to allow for the expansion of the interstitial fluid compartment in dialysis patients) this would make a total $V_D$ of 135 L.

Even with this adjustment the predicted single compartment kinetics reduction ratio becomes 59%, still well in excess of what is seen using prior art hemodialysis related techniques. One published mathematical model of PBUT kinetics during hemodialysis includes the intracellular water as part of the $V_D$ for PBUT. This would add approximately another 30 L to the $V_D$ but the $V_D$ so created is very unlikely to function as a uniform compartment. It is also somewhat counterintuitive to assume that a potentially toxic metabolite such as PCS, secreted by the liver and, in renal health, destined for secretion in the proximal tubule, would also be taken up by other cells in the body thereby reducing the efficiency of its elimination.

Published rate constants for the dissociation of PBUT are not readily available however the binding interaction appears to be relatively weak, reliant upon van der Waals forces, which suggests that the dissociation rate constants are likely to be quite high. The focus is therefore on the kinetics of PBUT diffusive mass transfer including that from the blood to the dialysate compartments of the hemodialyzer. Their albumin binding suggests that the diffusive transfer of PBUT may also be impaired by interactions with other large proteins.

For example, if the first hemodialyzer has an albumin sieving coefficient of 0.1 and the haemofiltration rate were 70 ml/min with a plasma flow rate of 210 ml/min then, considering only PBUT dissociation from albumin in the hemodiafiltrate and ignoring diffusive flux of unbound PBUT across the hemodialyzer membrane, PBUT clearance into the primary hemodiafiltrate would be:

$$70 + \left(70 \times 0.1 \times \frac{0.93}{0.07}\right) = 163 \text{ ml/min}$$

The volume into which these PBUT are then distributed is expanded by a dialysate flow of 600 ml/min and therefore, assuming non saturable PBUT albumin binding, the proportion found free in the hemodiafiltrate will be:

$$\frac{670}{670+93} = 0.88$$

If 95% of the volume of hemodiafiltrate is removed by the secondary ultrafiltration process and all of the albumin is returned, the proportion of unbound PBUT in hemodiafiltrate extracted by the secondary ultrafiltration process is:

$$0.88 \times 0.95 = 0.836$$

the resulting clearance of PBUT is:

$$0.836 \times 163 \text{ ml/min} = 136 \text{ ml/min}$$

as a proportion of total $V_D$ (including interstitial albumin) the removal rate is:

$$\frac{136}{135,000} = 1 \times 10^{-3} \text{ per minute}$$

Over the 240 minutes of a treatment session the resulting contribution to the PBUT reduction ratio would be approximately 21%, exclusive of any components due to diffusive flux and/or albumin losses across the second hemodialyzer.

Similar calculations based on the flow parameters shown in Tables 2 and 3, indicate that increasing the flow of fresh dialysate (d) from 600 to 1200 ml/min only increases the reduction in post sessional PBUT concentration from 23% to 25% (again ignoring diffusive flux and losses associated with albumin).

Greater increases in post sessional PBUT concentration reduction can be achieved by employing first hemodialyzers with higher albumin sieving coefficients. Based on the volume flow rate parameters shown in Table 1 but using a first hemodialyzer with an albumin sieving coefficient of unity the expected reduction would be 51% increasing to 65% if the dialysate volume flow rate is increased to 1200 ml/min. The use of very porous membranes in the first hemodialyzer will tend to increase albumin losses. However, if the potential for increasing PBUT extraction is seen as the major therapeutic advantage of the invention then the use of less porous membranes, for example standard high flux hemodialyzers, as the second hemodialysis in combination with a highly porous first hemodialyzer would allow high levels of PBUT extraction to be achieved whilst keeping albumin losses to a minimum albeit sacrificing the increase in LMWP extraction that could otherwise be achieved The invention has been described by way of examples only and it will be appreciated that variation may be made to the aforementioned embodiments, without departing from the scope of protection, as defined by the claims.

The invention claimed is:

1. A hemodialysis apparatus for ultrafiltering blood from a patient, the hemodialysis apparatus comprising:
a first dialyzer circuit which includes a first hemodialyzer including a blood compartment and a dialysate compartment separated by a first hemodialyzer membrane which filters blood in that is forced into the blood compartment thereof by at least a first pump, the dialysate compartment being fed with dialysate pumped thereinto by at least a second pump through a first side of a first balance chamber and outputting hemodiafiltrate into a blood compartment of a second hemodialyzer, an output of the blood compartment of the first hemodialyzer being combined with an output of the blood compartment of the second hemodialyzer to generate blood out;
a second dialyzer circuit which facilitates dissociation of plasma protein bound uremic toxins, the second dialyzer circuit including the second hemodialyzer with a second hemodialyzer membrane which separates the uremic toxins from the plasma protein by ultrafiltration to output a residue of the hemodiafiltrate containing concentrated plasma protein from the blood compartment of the second hemodialyzer for recirculation to the blood out to the patient, at least a third pump being connected between an output from the first hemodialyzer and an input to the blood compartment of the second hemodialyzer, and a dialysate compartment output comprising a filtrate of the hemodiafiltrate from the second hemodialyzer being pumped through a second side of the first balance chamber; and a second balance chamber connected to the second hemodialyzer,
the first hemodialyzer membrane is more porous than the second hemodialyzer membrane.

2. The hemodialysis apparatus according to claim 1, wherein:
an additional pump is connected to an output of the second hemodialyzer and is operative to control a volume flow rate of net fluid removal from an extracorporeal blood circuit.

3. The hemodialysis apparatus according to claim 1, wherein:
the second hemodialyzer ultra filters at least 90% of a volume of filtered hemodiafiltrate passing therethrough.

4. The hemodialysis apparatus according to claim 1, wherein:
the at least the third pump is operative to vary a volume flow rate of the hemodiafiltrate that is passed to the second hemodialyzer.

5. The hemodialysis apparatus according to claim 1, wherein;
at least a fourth pump operative to vary a proportion of hemodiafiltrate that is infused to the patient via a venous (return) side of an extracorporeal blood circuit.

6. The hemodialysis apparatus according to claim 1, wherein:
a pressure source ensures that hydraulic pressure in a section of a fluid pathway between the at least the third pump and at least a fourth pump operated within operational limits required for accurate volumetric performance of the at least the third pump and the at least the fourth pump.

7. The hemodialysis apparatus according to claim 6, wherein:
the pressure source is a pump.

8. The hemodialysis apparatus according to claim 1, wherein:
the at least the second pump and an additional pump operate to ensure a volume flow rate of hemodiafiltration replacement fluid enters the first dialyzer circuit for infusion into a venous side of an extracorporeal blood circuit.

9. The hemodialysis apparatus according to claim 8, wherein:
the first balance chamber is connected to the at least the second pump and to at least a fifth pump, whereby
the first balance chamber ensures correct volume flow rates for the hemodiafiltrate to be infused into the patient in event of a failure of any of the at least the first pump, the at least the second pump, the at least the third pump, and at least a fourth pump.

10. The hemodialysis apparatus according to claim 1, wherein:
the second balance chamber is connected to the first balance chamber and to the at least third pump; and
the second balance chamber is operative to ensure that a volume flow rate of the hemodiafiltrate is at least equal to a volume flow rate of incoming fresh dialysate.

11. The hemodialysis apparatus according to claim 1, wherein:
at least a fourth pump is operative, in dependence upon operator specified criteria, to vary an ultrafiltration volume flow rate in the first hemodialyzer.

12. The hemodialysis apparatus according to claim 1, further comprising:
a first sensor configured to transmit a signal indicative of hydraulic pressure in the first dialyzer circuit and the second dialyzer circuit;
a second sensor configured to transmit a signal indicative of a pumping pressure;
a third sensor configured to transmit a signal indicative of a pumping speed;
a fourth sensor configured to transmit a signal indicative of a saline concentration;
a fifth sensor configured to transmit a signal indicative of an electrical conductance of a solute in the hemodiafiltrate; and
a sixth sensor configured to transmit a signal indicative of a concentration of a solute in the hemodiafiltrate.

13. The hemodialysis apparatus according to claim 12, further comprises:
a control means to vary a volume of the ultrafiltered hemodiafiltrate passing from the second hemodialyzer and to vary a proportion of the protein concentrated hemodiafiltrate for infusion into a venous side of an extracorporeal blood circuit.

14. The hemodialysis apparatus according to claim 12, further comprising:
a memory configured to record the patient's details, patient related data, a dialysis start time, a dialysis end time, and operational data relating to pumping data.

15. The hemodialysis apparatus according to claim 14, further comprising:
a memory configured to record data from the first sensor through the sixth sensor.

16. The hemodialysis apparatus according to claim 1, further comprises:
   a means to vary a volume flow rate of the hemodiafiltrate to a venous side of an extracorporeal blood circuit.

17. The hemodialysis apparatus according to claim 1, further comprises:
   a sensor configured to sense a state of a membrane performance with treatment time, and
   a processor configured to determine a risk of membrane rupture and to trigger an alarm.

18. The hemodialysis apparatus according to claim 1, further comprises:
   a sensor arranged to sense back filtration from the second hemodialyzer and to trigger an alarm.

19. The hemodialysis apparatus according to claim 1, further comprising:
   a processor operative to initiate pulses of raised pressure in the dialysate compartment of the first hemodialyzer and/or the second hemodialyzer.

20. The hemodialysis apparatus according to claim 1, wherein:
   the first hemodialyzer membrane is housed within a removable cartridge.

21. The hemodialysis apparatus according to claim 1, further comprising:
   a monitor configured to monitor a preset patient criterion and to trigger an alarm when the preset patient criterion is not satisfied.

\* \* \* \* \*